(12) United States Patent
Pohler

(10) Patent No.: US 7,591,477 B2
(45) Date of Patent: Sep. 22, 2009

(54) SYSTEM FOR CAPTURING A VEHICLE

(76) Inventor: Harvey L. Pohler, P.O. Box 904, 112 San Iacinto, Shiner, TX (US) 77984

( * ) Notice: Subject to any disclaimer, the term of this patent is extended or adjusted under 35 U.S.C. 154(b) by 40 days.

(21) Appl. No.: 12/073,646

(22) Filed: Mar. 7, 2008

(65) Prior Publication Data
US 2008/0224447 A1  Sep. 18, 2008

Related U.S. Application Data

(60) Provisional application No. 60/906,723, filed on Mar. 14, 2007.

(51) Int. Cl.
*B60D 1/24* (2006.01)
(52) U.S. Cl. ............... 280/502; 280/505; 280/762
(58) Field of Classification Search ............ 280/400, 280/402, 502, 505, 762; 404/6; 180/287; 293/118; 414/462, 563; 70/17; 294/88, 294/106, 110.1
See application file for complete search history.

(56) References Cited

U.S. PATENT DOCUMENTS

| | | | |
|---|---|---|---|
| 1,557,410 A * | 10/1925 | Breslav | 293/118 |
| 2,107,312 A | 2/1938 | Thompson | |
| 2,157,612 A | 5/1939 | Kirk | |
| 2,194,623 A | 3/1940 | Thompson | |
| 2,625,278 A | 1/1953 | Sensenbaugh | |
| 4,773,666 A | 9/1988 | Koberlein et al. | |
| 4,962,945 A | 10/1990 | Vannoy et al. | |
| 5,476,280 A | 12/1995 | MacMullan | |
| 5,611,408 A | 3/1997 | Abukhader | |
| 5,722,810 A | 3/1998 | Young et al. | |
| 5,839,759 A | 11/1998 | Trigo | |
| 6,176,519 B1 | 1/2001 | Limingoja | |
| 7,168,906 B2 | 1/2007 | Weatherford | |
| 7,220,076 B2 | 5/2007 | Boll | |
| 7,275,889 B1 | 10/2007 | McGill | |
| 2005/0052012 A1 | 3/2005 | Weatherford | |
| 2009/0127876 A1 * | 5/2009 | Stock, Jr. | 293/118 |

FOREIGN PATENT DOCUMENTS

| | | |
|---|---|---|
| FR | 2761182 | 9/1998 |
| JP | 2002-362216 | 12/2002 |

* cited by examiner

*Primary Examiner*—Anne Marie Boehler
(74) *Attorney, Agent, or Firm*—Richard C. Litman

(57) ABSTRACT

The system for capturing a vehicle is a device, which is mounted on the front of a first vehicle for deploying a grasping hook for grasping the rear bumper of a second vehicle. In operation, the system begins in a locked configuration, with a hook member being positioned rearward with respect to a lower shaft. When the first vehicle brings an actuating arm in contact with the rear bumper of the second vehicle, pressure on the actuating arm generates rotation in the upper shaft. This rotation of the upper shaft causes disengagement of the lower end of an engaging member from a recess formed in a disc mounted on the lower shaft, causing the resiliently biased lower shaft to rotate. Rotation of the lower shaft rotates an elongated hook support and the hook member into the deployed configuration, with the hook member grasping the rear bumper of the second vehicle.

17 Claims, 4 Drawing Sheets

SYSTEM FOR CAPTURING A VEHICLE

CROSS-REFERENCE TO RELATED APPLICATION

This application claims the benefit of U.S. Provisional Patent Application Ser. No. 60/906,723, filed Mar. 14, 2007.

BACKGROUND OF THE INVENTION

1. Field of the Invention

The present invention relates to systems for apprehending fleeing vehicles, and particularly to a system for capturing that deploys a hook from a first vehicle for penetrating and securing the rear bumper of a second vehicle.

2. Description of the Related Art

The apprehension of criminals who are fleeing in vehicles from law authority personnel, who are also in vehicles, can greatly disrupt the safety and well being of nearby citizens. In a high-speed chase or pursuit of criminals, other vehicles, pedestrians and the law enforcement personnel are all put at risk.

Various methods of capturing or stopping a fleeing vehicle are known, including the shooting out the fleeing vehicle's tires, following the fleeing vehicle until it crashes or runs out of fuel, using crash barriers which are erected in the path of the fleeing vehicle, or spreading nails, either loosely strewn or attached to strips, on the roadway to puncture the fleeing vehicle's tires. Other systems and methods include the use of a barbed harpoon to snare the vehicle, as well as further devices that disable the fleeing vehicle's engine by burning out the ignition through application of electronic or microwave energy.

Such systems and methods, however, provide additional unsafe conditions beyond the safety risk of the chase itself. For example, disabling the fleeing vehicle's engine also causes the fleeing vehicle to lose overall power, including power to power steering and brakes, which could result in a serious accident. Harpooning the vehicle may lead to accidental impaling of the driver or passenger in the fleeing vehicle, and also lead to the vehicle going out of control. Nail strips, crash barriers and the like require a great deal of effort and set-up, with time and energy not always being available to do so, and may also cause the vehicle to go out of control, thus accidentally injuring pedestrians and other drivers.

Thus, a system for capturing a vehicle solving the aforementioned problems is desired.

SUMMARY OF THE INVENTION

The system for capturing a vehicle includes a device mounted on the push bumper of a first vehicle (such as a police car, for example) for deploying a grasping hook for penetrating and securing the rear bumper of a second vehicle (such as a fleeing or pursued vehicle). The system includes a support adapted for mounting to the bumper of the first vehicle, with the support preferably including a pair of laterally opposed side plates.

An upper shaft is rotatably joined to the pair of laterally opposed side plates and extends therebetween along the lateral direction. At least one actuating arm is secured at an upper end thereof to the upper shaft, with the at least one actuating arm extending substantially downward and forward with respect to the upper shaft.

An engaging member having opposed upper and lower ends is further provided, with the upper end thereof being secured to the upper shaft, and extending substantially downward and rearward with respect to the upper shaft. A lower shaft is additionally rotatably joined to the pair of laterally opposed side plates, with the lower shaft extending therebetween along the lateral direction. The lower shaft is resiliently biased with respect to the pair of laterally opposed side plates.

A disc is mounted on the lower shaft and a recess is formed in a perimeter of the disc. The lower end of the engaging member releasably engages the recess and selectively locks rotation of the lower shaft. An elongated hook support having opposed first and second ends is additionally provided, with the first end being secured to the lower shaft. A hook member is mounted to the second end of the elongated hook support.

In operation, the system begins in a locked configuration, with the hook member being positioned rearward with respect to the lower shaft. The hook member begins in a folded state, parallel to the actuating arms and substantially horizontal with respect to the ground. When the driver of the first vehicle brings the at least one actuating arm in contact with the rear bumper of the second vehicle, pressure on the at least one actuating arm (and rotation thereof about the upper shaft) generates rotation in the upper shaft, resulting in the unfolding of the hook member from its initial position. This rotation of the upper shaft causes disengagement of the lower end of the engaging member from the recess in the disc, thus causing the elastically biased lower shaft to rotate. The rotation of the lower shaft rotates the elongated hook support and the hook member into the deployed configuration, with the hook member grasping the rear bumper of the second vehicle. It should be noted that the hook member begins unfolding upon contact of the actuating arm(s) with the rear bumper of the fleeing vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
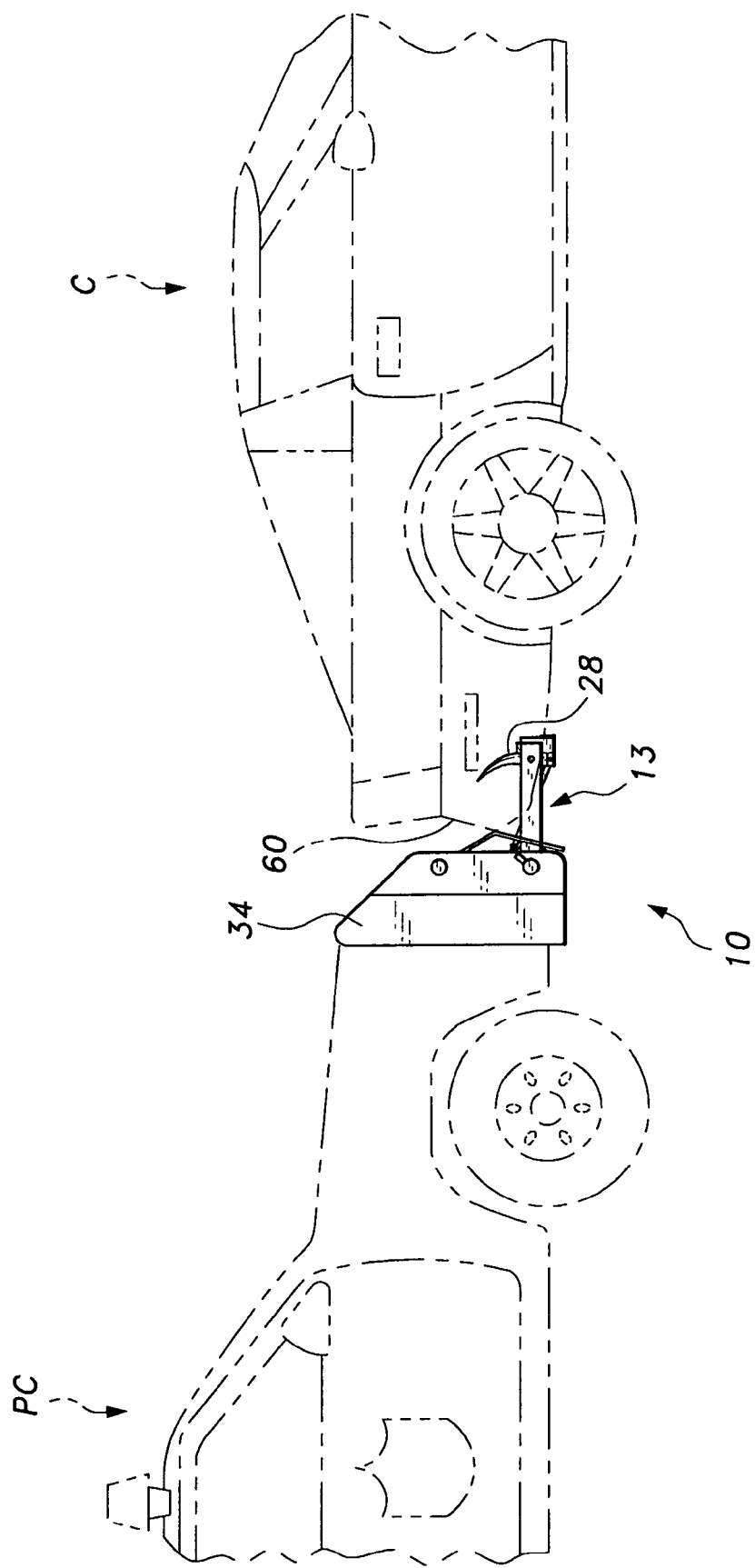
FIG. 1 is an environmental view of a system for capturing a vehicle according to the present invention.

The present invention is directed towards a system for capturing a vehicle 10. The system for capturing a vehicle 10 is a device which is mounted on the push bumper or other front surface of a first vehicle (such as exemplary police car PC in FIG. 1) for deploying a grasping hook 28 for penetrating and securing the rear bumper 60 of a second vehicle (such as fleeing or pursued car C in FIG. 1). As shown in FIGS. 1-4, the system 10 includes a support adapted for mounting to the bumper 34 of the first vehicle, with the support preferably including a pair of laterally opposed side plates 38.

An upper shaft 14 is rotatably joined to the pair of laterally opposed side plates 38 and extends therebetween along the lateral direction. At least one actuating arm 12 is secured at an upper end thereof to the upper shaft 14, with the at least one actuating arm 12 extending substantially downward and forward with respect to the upper shaft 14. As shown, a pair of actuating arms 12 are preferably provided, with the pair of actuating arms 12 being positioned on laterally opposed sides of the elongated hook support 13 (to be described in greater detail below).

An engaging member 16 having opposed upper and lower ends is further provided, with the upper end thereof being secured to the upper shaft 14, and extending substantially downward and rearward with respect to the upper shaft 14. A lower shaft 22 is additionally rotatably joined to the pair of laterally opposed side plates 38, with the lower shaft 22 extending therebetween along the lateral direction. The lower shaft 22 is elastically biased with respect to the pair of laterally opposed side plates 38. The engaging member 16 preferably has a substantially L-shaped cross-sectional shape, as shown. Further, an intermediate rod 56 is further provided to prevent excessive rearward rotation of the engaging member 16.

A disc 18 is mounted on the lower shaft 22 and a recess 20 is formed in a perimeter of the disc 18. The lower end of the engaging member 16 releasably engages the recess 20 and selectively locks rotation of the lower shaft 22. An elongated hook support 13 having opposed first and second ends is additionally provided, with the first end being pivotally secured to the lower shaft 22. A hook member 28 is mounted to the second end of the elongated hook support 13.

In operation, the system 10 begins in a locked configuration (shown in FIG. 2), with the hook member 28 being positioned rearward with respect to the lower shaft 22. When the driver of the first vehicle PC brings the at least one actuating arm 12 in contact with the rear bumper 60 of the second vehicle car C in FIG. 1), pressure on the at least one actuating arm 12 (and rotation thereof about the upper shaft 14) generates rotation in the upper shaft 14. This rotation of the upper shaft 14 causes disengagement of the lower end of the engaging member 16 from the recess 20 in the disc 18, thus causing the elastically biased lower shaft 22 to rotate. The rotation of the lower shaft 22 rotates the elongated hook support 13 and the hook member 28 into the deployed configuration (shown in FIG. 3), with the hook member 28 grasping the rear bumper 60 of car C. Pivot 46 of central member 26 causes the pivoting or unfolding of the hook member 28 against stop 30 first, with rotation of the elongated hook support 13 (i.e., pivoting of the side arms 32) following. It should be noted that the hook member 28 begins unfolding upon contact of the actuating arm(s) 12 with the rear bumper of the fleeing vehicle.

Figure 3:
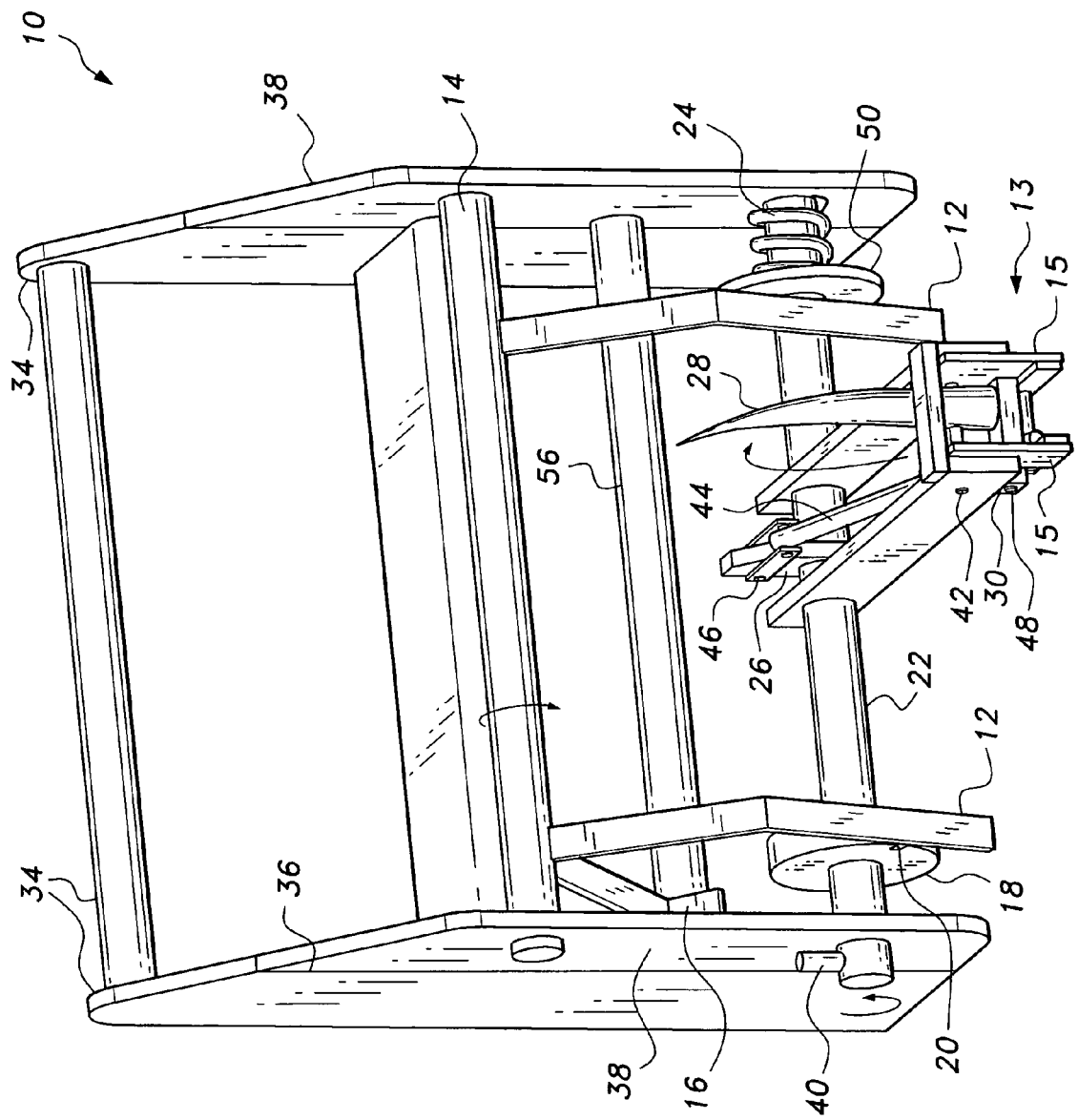
FIG. 3 is a perspective view of the system for capturing a vehicle according to the present invention, shown in a deployed configuration.

As best shown in FIG. 3, the elongated hook support 13 includes a pair of side arms 32, with the hook member 28 being pivotally secured therebetween. A stop bar 30 is mounted to, and extends between, the pair of side arms 32 adjacent the hook member 28 for preventing forward rotation of the hook member 28 when the system 10 is in the deployed configuration. Additionally, a central member 26 is secured to the lower shaft 22 between the pair of side arms 32, and a rod 44 having opposed first and second ends is further provided. The first end of the rod 44 is pivotally secured to the central member 26 (by a pivot pin 46 or the like) and the second end thereof is pivotally secured to the hook member 28 adjacent the opposite end of the arms 32, by a pivot pin 48 or the like.

The elongated hook support 13 further includes a pair of downwardly extending side plates 15 respectively secured to inner surfaces of the pair of side arms 32. The hook member 28 is pivotally secured between upper ends thereof by pivot pin 42 or the like, with the second end of the rod 40 being pivotally secured at 48 between lower ends thereof. As shown, the elongated hook support 13 is positioned substantially centrally with respect to the lower shaft 22. The first ends of the arms 32 freely rotate about the lower shaft 22, but the central member 26 is secured thereto via welding or the like. Thus, the central member 26 completes rotation (upon deployment) before the side arms 32, causing pivotal movement of the rod 44 with respect to both the central member 26 and side arms 32, deploying the hook member 24. It is important to note that central member 26 begins rotation prior to the rotation of side arms 32 (noting that side arms 32 are not fixedly secured to shaft 22).

Figure 2:
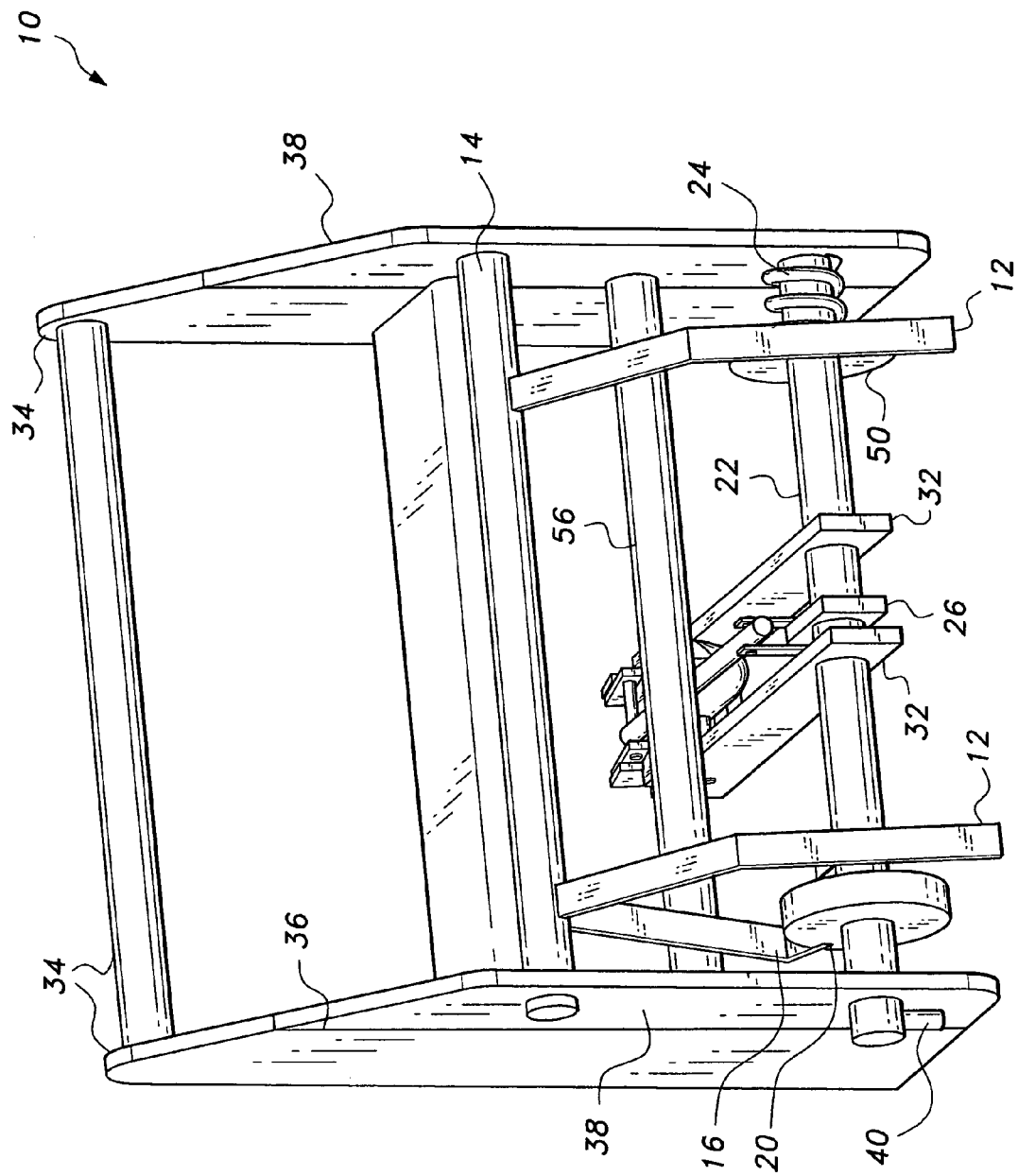
FIG. 2 is a perspective view of the system for capturing a vehicle according to the present invention, shown in a locked configuration.

Further, as best shown in FIGS. 2 and 3, helical spring 24 preferably provides the elastic biasing of lower shaft 22, with the helical spring 24 being wound about a first end of the lower shaft 22. A securement member 50, preferably formed as a plate, as shown, is mounted on the lower shaft 22. The helical spring 24 has opposed first and second ends, with the first end thereof being secured to an adjacent one of the laterally opposed side plates 38, and the second end being secured to the securement member 50.

Further, the disc 18 is mounted adjacent a second end of the lower shaft 22, with the second end being laterally opposed from the first end thereof (i.e., the disc 18 is laterally opposed from the spring 24). The second end of the lower shaft preferably projects through and extends beyond the adjacent one of the laterally opposed side plates 38, with a handle member 40 being mounted to the second end of the lower shaft. The handle member 40 allows for external rotation of the shaft 22, such that following deployment, the shaft 22 may be rotated back to the locked position (of FIG. 2) in order to set the system 10 for the next deployment thereof.

Figure 4:
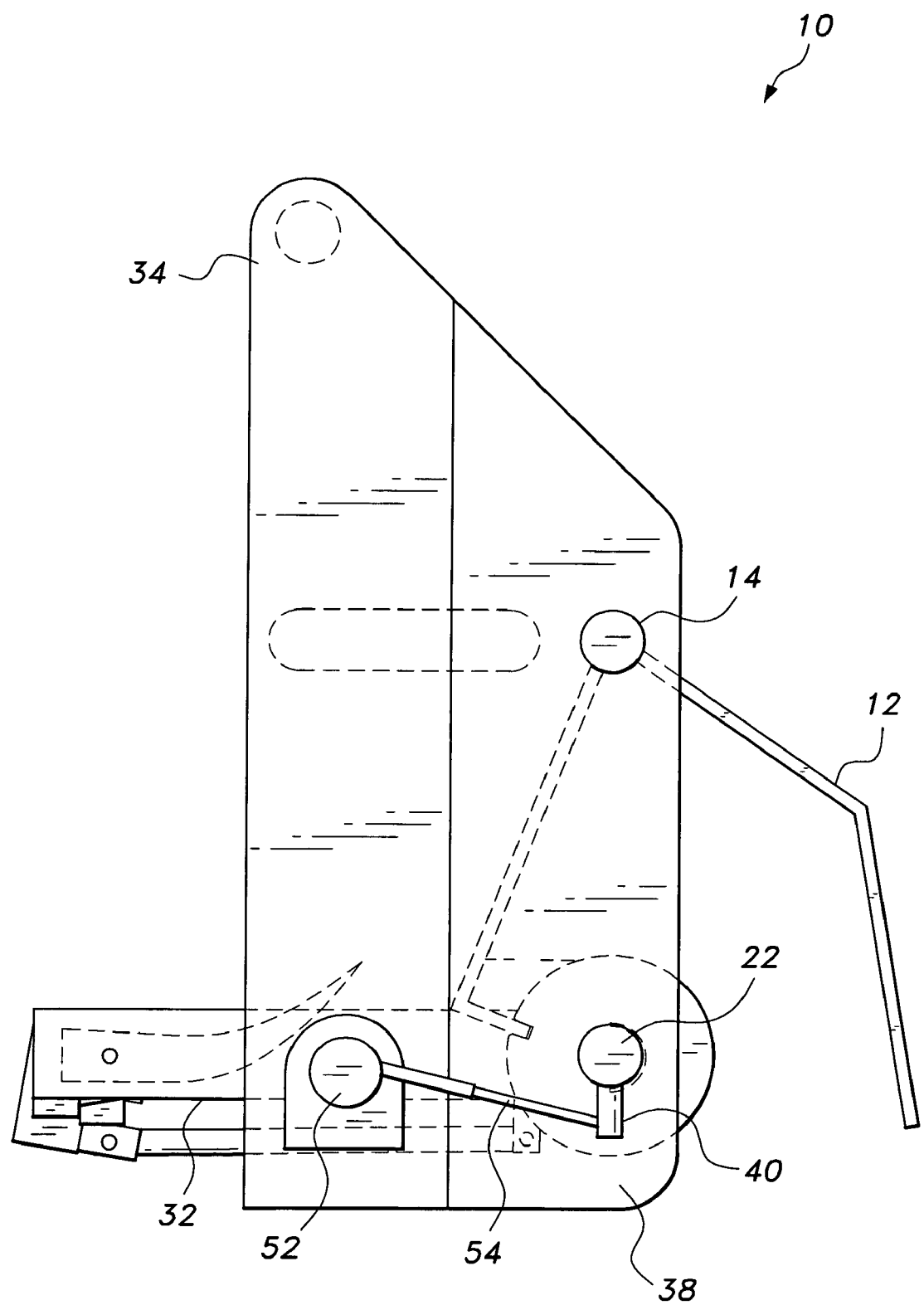
FIG. 4 is a side view of the system for capturing a vehicle according to the present invention.

As shown in FIG. 4, an external system may be mounted to the first vehicle for driving rotation of the shaft 22. Though shown as an exemplary motor 52 with an exemplary linkage 54, it should be understood that any suitable system for driving rotation of shaft 22 may be utilized, such as an electric motor, a hydraulic cylinder, a chain and sprocket or the like. Preferably, the driver of the first vehicle has control over motor 52 or the like to rotate shaft 22 back to the locked position of FIG. 2. Linkage 54 is preferably secured to handle member 40, as shown.

It is to be understood that the present invention is not limited to the embodiment described above, but encompasses any and all embodiments within the scope of the following claims.

I claim:

1. A system for capturing a vehicle, comprising:
    a support adapted for mounting to a bumper of a first vehicle, the support having a pair of laterally opposed side plates;
    an upper shaft rotatably joined to the pair of laterally opposed side plates, the upper shaft extending therebetween along the lateral direction;
    at least one actuating arm secured at an upper end thereof to the upper shaft, the at least one actuating arm extending substantially downward and forward from the upper shaft;
    an engaging member having opposed upper and lower ends, the upper end thereof being secured to the upper shaft, the engaging member extending substantially downward and rearward from the upper shaft;
    a lower shaft rotatably joined to the pair of laterally opposed side plates, the lower shaft extending therebetween along the lateral direction, the lower shaft being resiliently biased with respect to the pair of laterally opposed side plates;
    a disc mounted on the lower shaft, the disc having a perimeter and a recess formed in the perimeter, the lower end of the engaging member releasably engaging the recess and selectively locking rotation of the lower shaft;

an elongated hook support having opposed first and second ends, the first end being pivotally secured to the lower shaft; and a hook member mounted to the second end of the elongated hook support;

wherein, in a locked configuration, the hook member is positioned rearward with respect to the lower shaft in a folded configuration; and wherein pressure applied to the at least one actuating arm generates rotation in the upper shaft with resulting disengagement of the lower end of the engaging member from the recess in the disc and rotation of the lower shaft, thereby unfolding the hook member and rotating the elongated hook support and the hook member into a deployed configuration, the hook member being adapted for grasping the rear bumper of a second vehicle.

2. The system for capturing a vehicle as recited in claim 1, wherein the elongated hook support comprises a pair of side arms, the hook member being pivotally secured therebetween.

3. The system for capturing a vehicle as recited in claim 2, wherein the elongated hook support further comprises a stop bar mounted to and extending between the pair of side arms adjacent the hook member for preventing forward rotation of the hook member when the system is in the deployed configuration.

4. The system for capturing a vehicle as recited in claim 3, wherein the elongated hook support further comprises:
   a central member secured to the lower shaft between the pair of side arms; and
   a rod having opposed first and second ends, the first end thereof being pivotally secured to the central member, the second end thereof being pivotally secured to the pair of side arms adjacent the hook member.

5. The system for capturing a vehicle as recited in claim 4, wherein the elongated hook support further comprises a pair of downwardly extending side plates secured to inner surfaces of the pair of side arms, respectively, the hook member being pivotally secured between upper ends thereof, the second end of the rod being pivotally secured between lower ends thereof.

6. The system for capturing a vehicle as recited in claim 1, wherein the elongated hook support is positioned substantially centrally with respect to the lower shaft.

7. The system for capturing a vehicle as recited in claim 1, further comprising a helical spring wound about a first end of the lower shaft.

8. The system for capturing a vehicle as recited in claim 7, further comprising a securement member mounted on the lower shaft, the helical spring having opposed first and second ends, the first end thereof being secured to an adjacent one of the laterally opposed side plates, the second end being secured to the securement member.

9. The system for capturing a vehicle as recited in claim 8, wherein the securement member comprises a plate secured to the lower shaft.

10. The system for capturing a vehicle as recited in claim 8, wherein said disc is mounted adjacent a second end of the lower shaft, the second end being laterally opposed from the first end thereof.

11. The system for capturing a vehicle as recited in claim 10, wherein the second end of the lower shaft projects through and extends beyond the adjacent one of the laterally opposed side plates.

12. The system for capturing a vehicle as recited in claim 11, further comprising a handle member mounted to the second end of the lower shaft.

13. The system for capturing a vehicle as recited in claim 12, further comprising means for driving rotation of the lower shaft, the means for driving contacting the handle member.

14. The system for capturing a vehicle as recited in claim 1, wherein the at least one actuating arm comprises a pair of actuating arms.

15. The system for capturing a vehicle as recited in claim 14, wherein the pair of actuating arms are positioned on laterally opposed sides of the elongated hook support.

16. The system for capturing a vehicle as recited in claim 1, wherein the engaging member has a substantially L-shaped cross-sectional shape.

17. The system for capturing a vehicle as recited in claim 1, further comprising an intermediate shaft secured to the pair of laterally opposed side plates and extending therebetween, the intermediate shaft being positioned rearwardly with respect to said engaging member, whereby the intermediate shaft prevents excessive rotation of the engaging member about the upper shaft.

* * * * *